(12) United States Patent
McVicar et al.

(10) Patent No.: US 9,561,943 B2
(45) Date of Patent: Feb. 7, 2017

(54) LOAD CARRYING TRUCKS

(71) Applicant: Combilift, Monaghan Town (IE)

(72) Inventors: Martin McVicar, County Monaghan (IE); Robert Moffett, County Monaghan (IE)

( * ) Notice: Subject to any disclaimer, the term of this patent is extended or adjusted under 35 U.S.C. 154(b) by 0 days.

(21) Appl. No.: 14/768,656

(22) PCT Filed: Feb. 18, 2014

(86) PCT No.: PCT/EP2014/053066
§ 371 (c)(1),
(2) Date: Aug. 18, 2015

(87) PCT Pub. No.: WO2014/125113
PCT Pub. Date: Aug. 21, 2014

(65) Prior Publication Data
US 2016/0002016 A1    Jan. 7, 2016

(30) Foreign Application Priority Data
Feb. 18, 2013    (GB) .................................. 1302811.3

(51) Int. Cl.
*B62B 3/06* (2006.01)
*B66F 9/075* (2006.01)
*B62D 7/15* (2006.01)

(52) U.S. Cl.
CPC ......... *B66F 9/07568* (2013.01); *B62D 7/1509* (2013.01); *B66F 9/07572* (2013.01)

(58) Field of Classification Search
CPC  B66F 9/07568; B66F 9/07572; B62D 7/1509; B60K 1/00; B60K 1/02; B60L 15/2036; B60L 2200/42; B60L 2200/44
(Continued)

(56) References Cited

U.S. PATENT DOCUMENTS

2005/0061570 A1* 3/2005 McVicar ................ B62D 7/026
180/308

FOREIGN PATENT DOCUMENTS

WO            02/28677           4/2002

* cited by examiner

*Primary Examiner* — Monica Carter
*Assistant Examiner* — Nirvana Deonauth
(74) *Attorney, Agent, or Firm* — Whiteford, Taylor & Preston, LLP; Gregory M. Stone

(57) ABSTRACT

A load-carrying truck has a fork lift mechanism mounted on a chassis, a pair of front wheels (24, 26) and a single rear wheel (30). At least one front wheel (26) and the rear wheel (30) are driven wheels whose speed is varied relative to one another differently depending on whether the truck is being driven in a forward reverse mode with the front wheels (24, 26) aligned generally parallel to the front-rear axis of the chassis and with steering controlled by steering the rear wheel (30), or a sideways mode with the rear wheel (30) aligned generally perpendicular to the front-rear axis of the chassis and with steering controlled by steering the at least one of the front wheels (26). When the truck is operated in forward/reverse mode and is steered towards the side on which the driven front wheel (26) is located, the relative speed (26) of that wheel is decreased progressively and comes to a stop when the axis of rotation of the rear wheel (30) intersects the front wheel position, and is driven in reverse at increasing speeds as the axis of the rear wheel (30) passes that point of intersection with further increasing steering angle. In the sideways mode of operation when the truck is steered in the direction towards the rear end of the chassis, the relative speed of the rear wheel (30) is decreased progressively and comes to a stop when the axis of rotation of the steered front wheel (26) intersects the rear wheel position, and the rear wheel (30) is driven in reverse at (Continued)

increasing speeds as the axis of the steered front wheel (26) passes said point of intersection with further increasing steering angle.

16 Claims, 11 Drawing Sheets

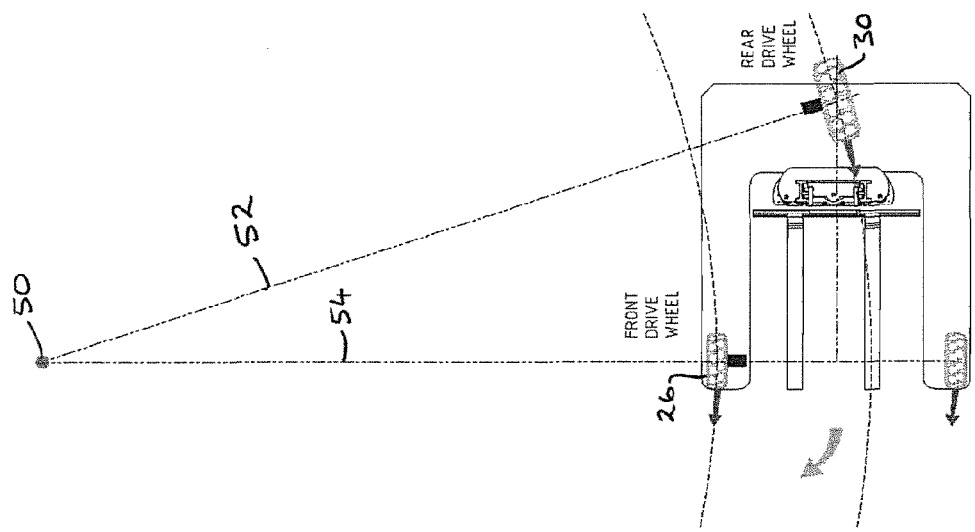
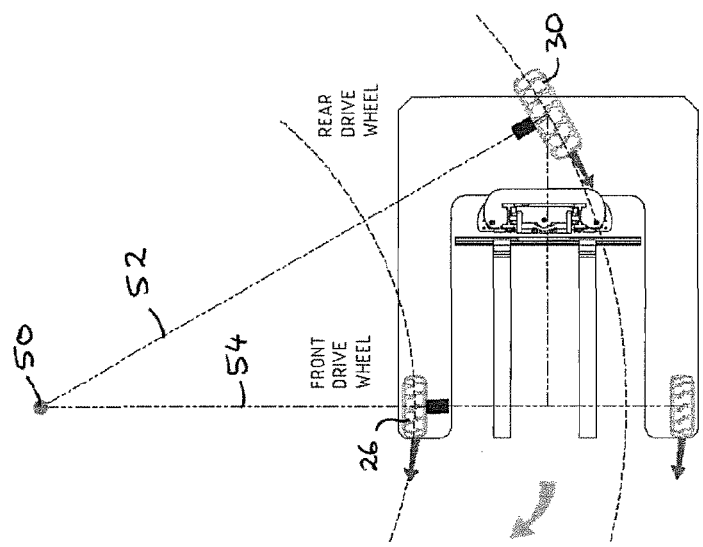
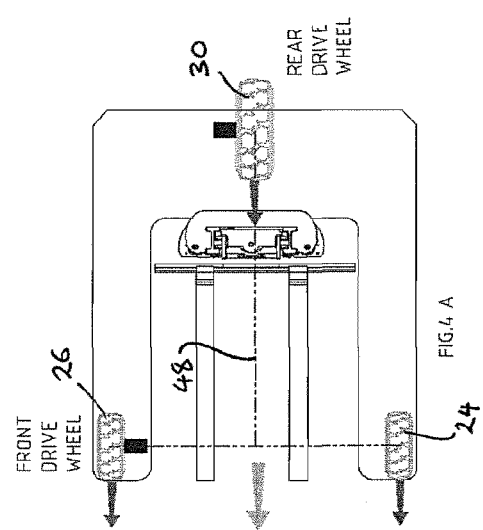

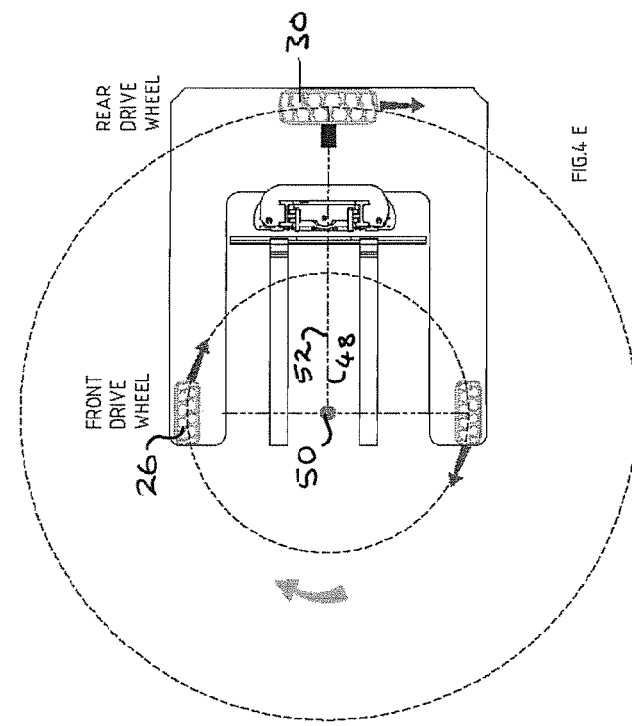
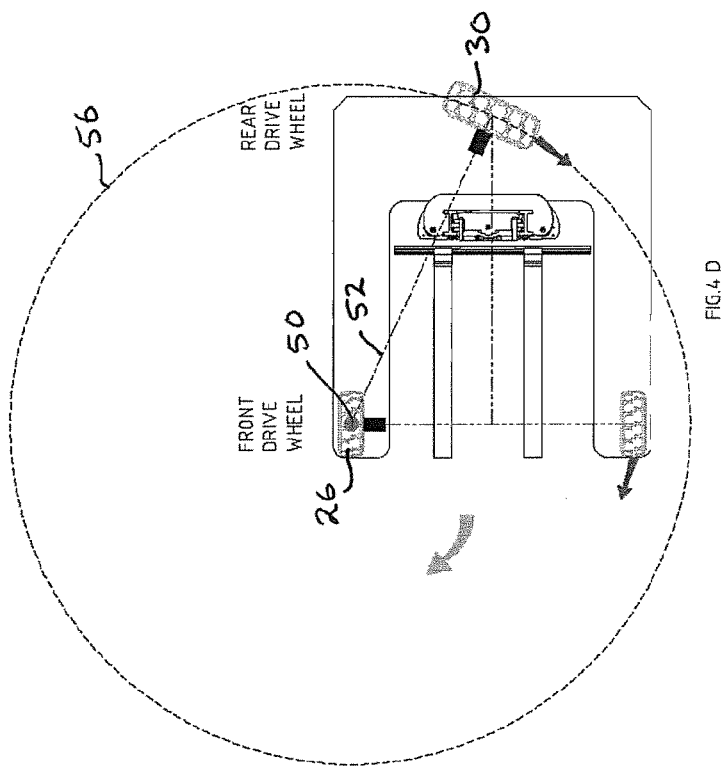

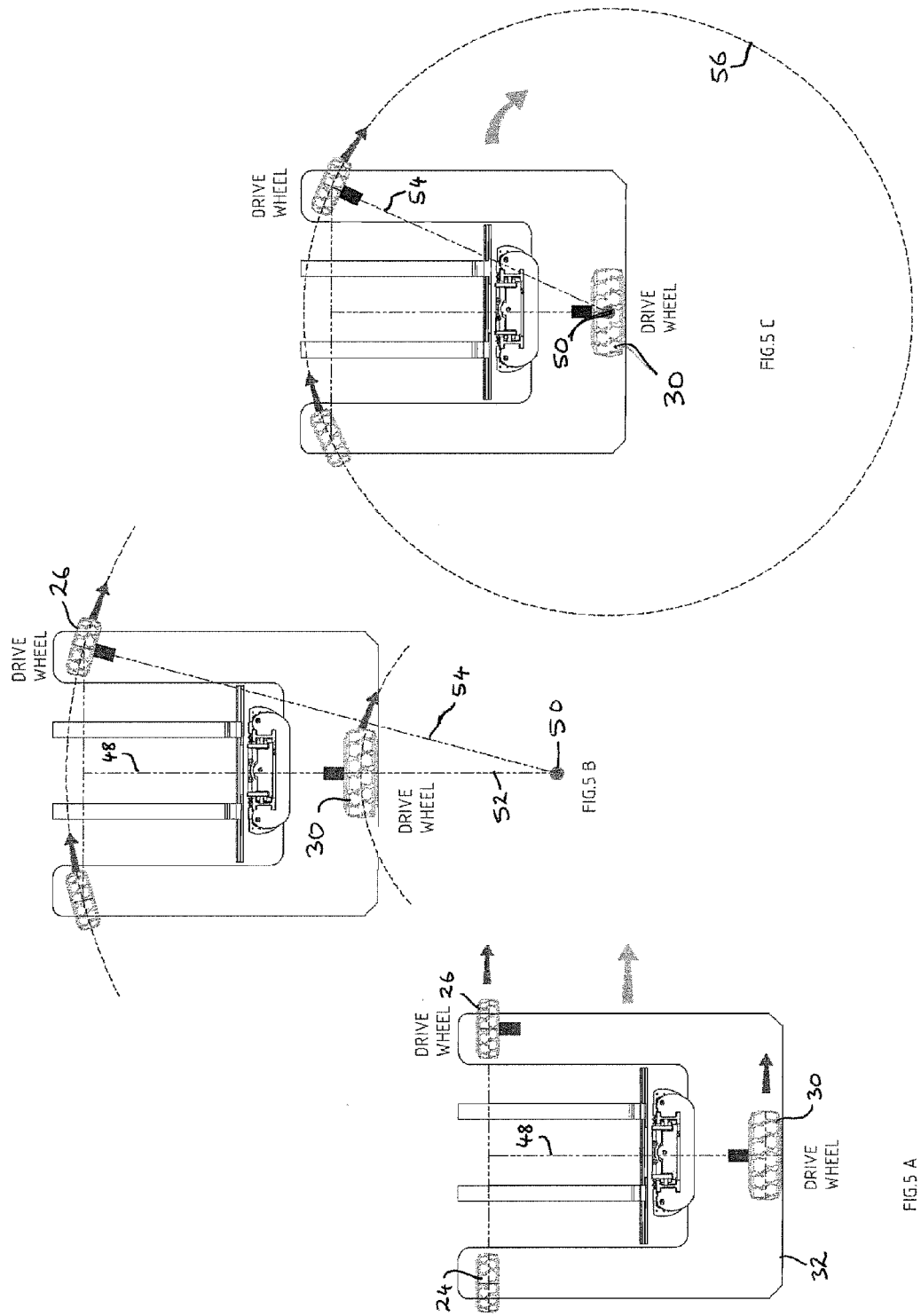

LOAD CARRYING TRUCKS

FIELD OF THE INVENTION

The present teaching relates to load carrying trucks and to improvements in steering and traction for such trucks.

The disclosure relates in particular to three-wheeled trucks which have a pair of front wheels and a single rear wheel and which can be operated in a forward-reverse mode of operation where the wheels are aligned (in a neutral steering position) parallel with the front-rear axis of the chassis of the truck, or in a sideways mode of operation where the wheels are aligned (in a neutral steering position) parallel to one another but perpendicular to the front-rear axis of the chassis.

BACKGROUND

FIG. 1 shows an example of such a truck 10 carrying a load 12. The truck has a U-shaped chassis 14 having a pair of arms 16, 18 extending forwardly of a bridge portion 20 with a fork lift mechanism 22 disposed between the arms. A pair of front wheels 24, 26 are disposed towards a front end 28 of the arms, one on either arm. A single rear wheel 30 is disposed centrally at the rear end 32 of the truck 10. In FIG. 1 the truck is shown with neutral steering in sideways mode.

Traditionally such trucks only drive with a single rear wheel 30. This can cause some undesirable effects when accelerating and braking. With a load on the truck, accelerating can cause the truck to torque steer around the load shown in FIG. 1.

The turning effect and direction is opposite but exaggerated during braking when only the rear wheel brakes. During braking the truck turns around the rear wheel due to the momentum of the load on top of the idle front wheels which have no braking. Due to the small wheel size the front wheels are idle and without brakes, they are a smaller diameter to keep the load platform low to maximise storage space. In this embodiment the rear wheel is larger than the front platform wheels for load carrying capacity.

FIG. 2 shows a truck that has one driven front wheel 26 and one driven rear wheel 30 using electric drive motors and brakes. The front right wheel 26 is driven and the front left wheel 24 idle. The turning effect is eliminated while accelerating, decelerating and braking with this solution. However the truck suffers from a problem when steering because the motor speeds and motor torque vary when turning left or right in either forward-reverse mode or sideways mode.

There is therefore a need for a load-carrying truck which addresses at least some of the drawsback of the prior art.

SUMMARY

The present treaching provides a load-carrying truck having a fork lift mechanism mounted on a chassis, the chassis having a front end and a rear end and a left and a right side, the truck comprising:

a pair of front wheels each disposed towards the front end of the chassis, one on the left side ant the other on the right side, and a single rear wheel disposed towards the centre of the rear end of the chassis, wherein at least one of the front wheels is driven and steerable and the rear wheel is driven and steerable, wherein the truck is operable in:

a forward/reverse mode of operation with the front wheels aligned generally parallel to the front-rear axis of the chassis and with steering controlled by steering the rear wheel which is in a neutral steering position when parallel with the front wheels, and a sideways mode of operation with the rear wheel aligned generally perpendicular to the front-rear axis of the chassis and with steering controlled by steering the at least one of the front wheels which is in a neutral steering position when parallel with the rear wheel, the truck further comprising an electrical motor control system for driving the at least one front wheel and the rear wheel at varying speeds of rotation relative to one another, wherein when the truck is operated in said forward/reverse mode or said sideways mode with neutral steering, the electrical motor control system drives the at least one front wheel and the rear wheel at rotational speeds proportional to one another in inverse relation to the ratio of the front and rear wheel diameters;

wherein when the truck is operated in said forward/reverse mode of operation and is steered in the direction towards the side on which the at least one driven front wheel is located, the relative speed of that wheel is decreased progressively in dependence on the angle of steering of the rear wheel such that the front wheel comes to a stop when the axis of rotation of the rear wheel intersects the front wheel position, and the front wheel is driven in reverse at increasing speeds as the axis of the rear wheel passes said point of intersection with further increasing steering angle; and wherein when the truck is operated in said sideways mode of operation and is turned in the direction towards the rear end of the chassis, the relative speed of the rear wheel is decreased progressively in dependence on the angle of steering of the at least one steered front wheel such that the rear wheel comes to a stop when the axis of rotation of the at least one steered front wheel intersects the rear wheel position, and the rear wheel is driven in reverse at increasing speeds as the axis of the steered front wheel passes said point of intersection with further increasing steering angle.

Thus, it can be seen that the truck is one with asymmetric dual drive wheels, located on different axes in the front-rear direction and where the positions of the driven wheels are laterally displaced relative to one another in the sideways direction. By varying the relative speeds of the front and rear wheels in both the front-reverse mode and the sideways mode, better traction can be maintained at all times.

When steered in the other direction (away from the driven front wheel side in forward-reverse mode and away from the rear wheel in the sideways mode) the relative speeds are similarly adjusted to ensure that traction is maintained by each driven wheel.

Preferably, said chassis is generally U-shaped in plan view having a pair of forwardly extending arms one on either side of the fork lift mechanism, with a bridging portion between the arms rearwardly of the forklift mechanism, and wherein the front wheels are located towards the forward ends of the left and right arms respectively and the rear wheel is located generally centrally on the bridge portion.

In a preferred embodiment, the other of the pair of front wheels is an idle undriven wheel.

In one aspect, based on one or more input signals received from one or more sensors the electrical motor control system outputs control signals for controlling the driven wheels. Advantageously, the input signals include a steering angle input signal. Preferably, the input signals include a throttle input signal. In one exemplary arrangement, the input signals are provided by a plurality of sensors which are associated with the respective driven wheels. Ideally, the inputs signals are provided by at least one of a wheel position sensor, a speed sensor, a throttle sensor.

In another aspect, each of the driven wheels is associated with a respective electrical motor which together form the electrical motor control system. Advantageously, each of the driven wheels is associated with a respective wheel position sensor. Preferably, each of the driven wheels is associated with a respective speed sensor. Ideally, each of the driven wheels is associated with a respective electrical motor controller. In one exemplary arrangement, the respective electrical motor controllers receive an input signal from a throttle sensor. Preferably, the respective electrical motor controllers receive an input signal from the respective wheel position sensor. In one example, the respective electrical motor controllers receive an input signal from the respective speed sensors.

BRIEF DESCRIPTION OF THE DRAWINGS

FIG. 4A is a plan view of the truck of FIG. 3 in a forward/reverse mode;
FIG. 4B is a plan view of the truck of FIG. 3 turning;
FIG. 4C is a plan view of the truck of FIG. 3 turning;
FIG. 4D is a plan view of the truck of FIG. 3 turning;
FIG. 4E is a plan view of the truck of FIG. 3 turning.

DETAILED DESCRIPTION OF THE DRAWINGS

The present teaching will now be described with reference to some exemplary load carrying trucks. It will be understood that the exemplary trucks are provided to assist in an understanding of the present teaching and is not to be construed as limiting in any fashion. Furthermore, features or elements that are described with reference to any one Figure may be interchanged with those of other Figures or other equivalent elements without departing from the spirit of the present teaching.

Figure 2:
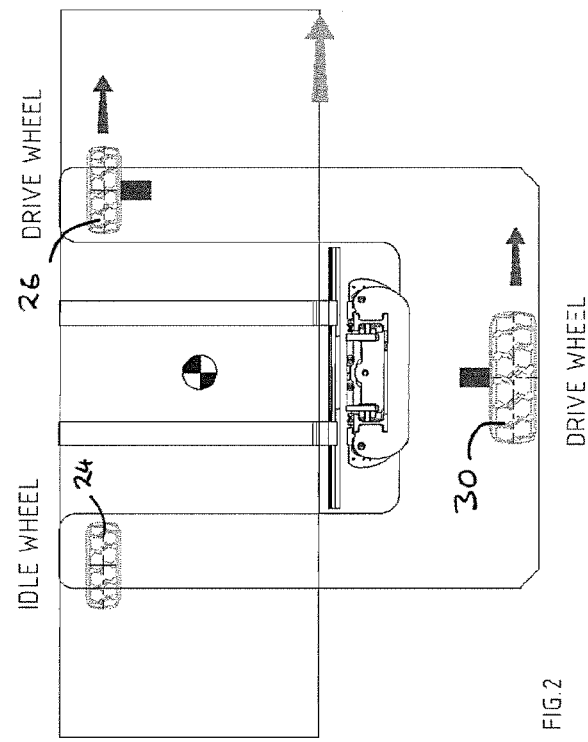
FIG. 2 is another plan view of an exemplary truck.
Figure 1:
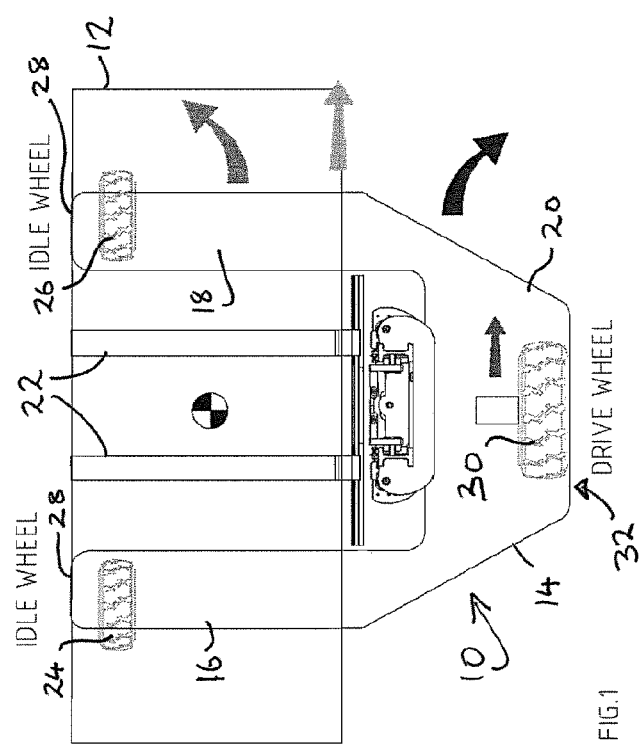
FIG. 1 is a plan view of an exemplary truck.
Figure 3:
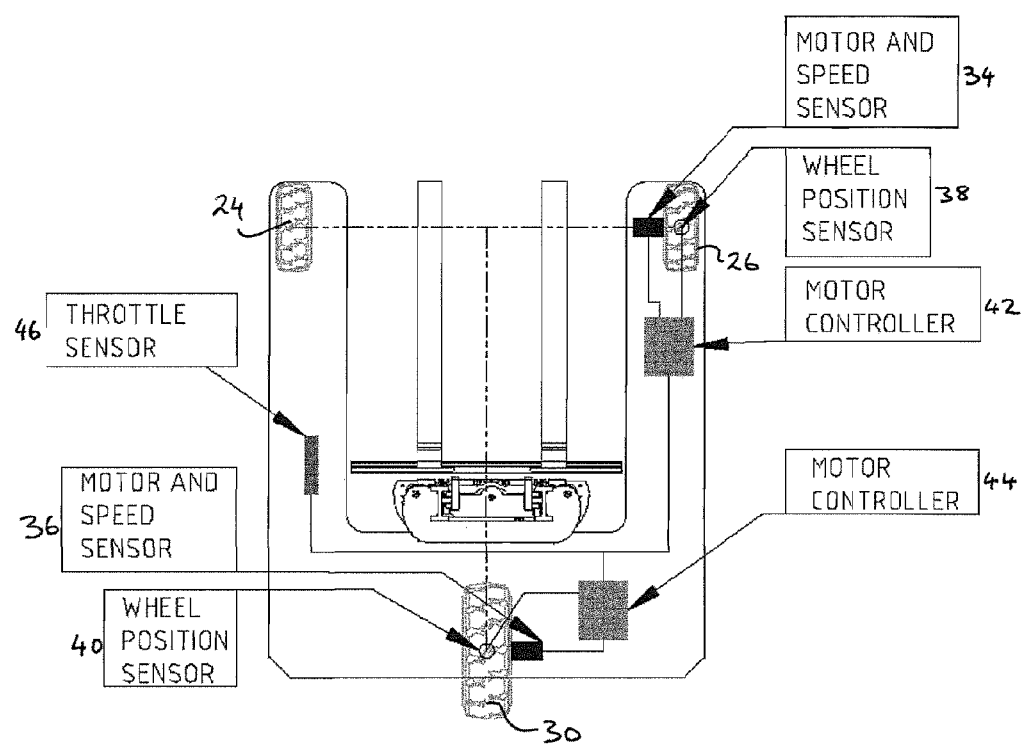
FIG. 3 is a plan view of a truck in accordance with the present teaching.

FIG. 3 shows a schematic arrangement of a truck which is generally configured along the lines of the trucks of FIGS. 1 and 2 and in which the same reference numerals denote similar components.

The front left wheel 24 is idle while the front right wheel 26 and rear wheel 30 are driven. Each of the driven wheels is provided with a respective electrical motor and speed sensor 34 (front), 36 (rear), a respective wheel position sensor 38 (front), 40 (rear), and a respective electrical motor controller 42 (front), 44 (rear). Additionally a throttle sensor 46 determines the throttle position. The electrical motor controllers 42, 44 each receive an input from the throttle sensor and from the electrical motor and speed sensor and wheel position sensor associated with the wheel under their control. Based on these inputs the electrical motor controllers 42, 44 output control signals to the electric motors driving the respective wheels 26, 30 in the manner described hereunder.

The pair of electrical motor controllers 42, 44 will be referred to collectively as an electrical motor control system. While the electrical motor control system of FIG. 3 is implemented as a pair of separate motor controllers, one could instead employ a single CPU, computer system, programmable logic controller or dedicated electronic control circuit to carry out the functions of both controllers shown in FIG. 3.

Firstly, when in a neutral steering position, whether in the forward/reverse mode (FIG. 4A) or sideways mode of operation (FIG. 5A), the electrical motor control system drives the front wheel 26 and the rear wheel 30 at rotational speeds proportional to one another in inverse relation to the ratio of the front and rear wheel diameters. So for example, if the rear wheel has a diameter 2.5 times greater than the front wheel, the front wheel will rotate in a neutral steering position 2.5 times faster than the rear wheel.

That neutral ratio of rotation speeds is varied when the truck is turned.

FIG. 4B shows the truck turning towards the right (i.e. towards the side on which the driven front wheel is found), the steering occurring due to a variation in the angle of the rear wheel with the front wheels held parallel to the front-rear axis 48 of the chassis (see FIG. 4A). The steering angle is increased in FIG. 4C, with the result that the point of intersection 50 between the rear wheel axis of rotation 52 and the front wheel axis of rotation 54 moves progressively closer to the truck between FIGS. 4B and 4C.

In FIG. 4D the rear wheel axis of rotation 52 intersects the driven front wheel 26 so that the point of intersection is now coincident with the front wheel 26. Looked at another way, the rear wheel is now being steered at an angle which causes it to follow a circle 56 centred on the driven front wheel's position.

The electrical motor controller progressively reduces the speed of the front wheel 26 relative to that of rear wheel 30 in the progression from FIG. 4A to 4B to 4C to 4D, at which point the driven front wheel is stopped.

Once the point of intersection 50 has moved inside the position of the driven front wheel 26 with increased steering angle of the rear wheel from the position shown in FIG. 4D, the front wheel 26 is driven in reverse at progressively increasing speeds. In FIG. 4E an example of such a steering position is seen with the rear wheel now steered with its axis of rotation perpendicular to the front wheels and coincident with the front-rear axis 48 of the chassis.

Figure 5:
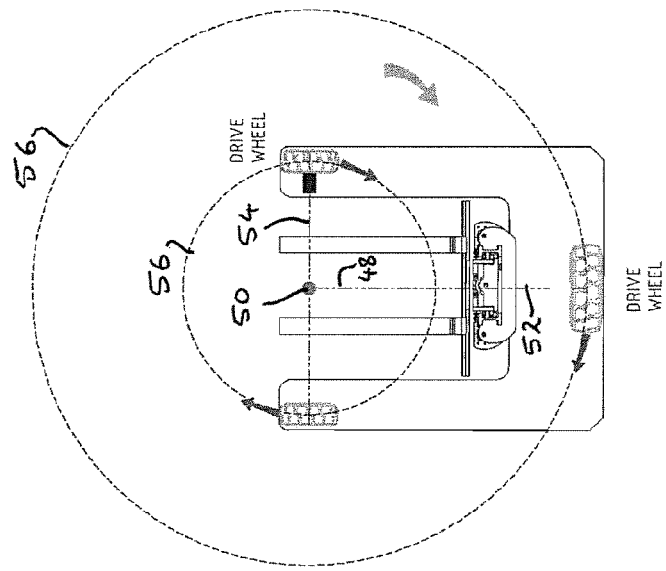
FIG. 5A is a plan view of the truck of FIG. 3 in a neutral steering position in a sideways mode.
FIG. 5B is a plan view of the truck of FIG. 3 turning.
FIG. 5C is a plan view of the truck of FIG. 3 turning.
FIG. 5D is a plan view of the truck of FIG. 3 turning.
FIG. 5E is a plan view of the truck of FIG. 3 turning.
FIG. 5F is a plan view of the truck of FIG. 3 turning.
Figure 5:
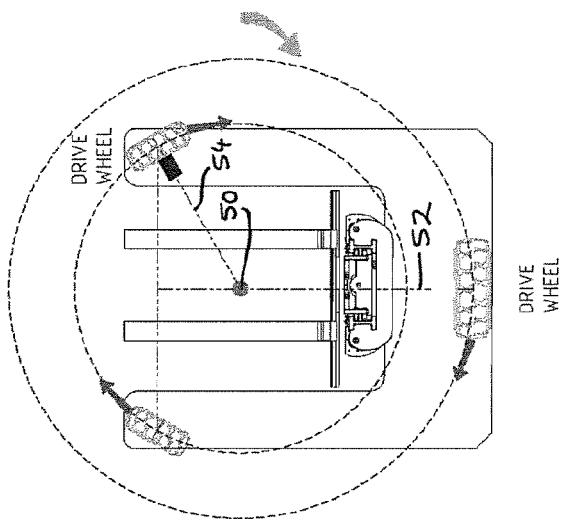
Figure 5:
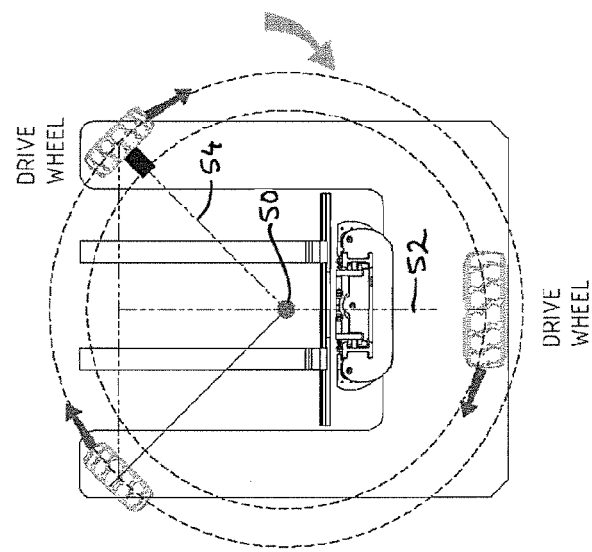

FIG. 5A shows the truck in neutral steering position in the sideways mode, with the wheels 24, 26, 30 parallel to each other and perpendicular to the front-rear axis 48. In this mode, the rear wheel remains in that perpendicular position and steering is accomplished by the front driven wheel 26. The idle undriven wheel is preferably also steered.

As the truck is driven sideways and is turned in the direction of the rear end 32 (FIG. 5B), the point of intersection 50 of the axes of rotation 52, 54 again moves progressively towards the truck. In the position shown in FIG. 5C the point of intersection is coincident with the rear wheel 30. In the progression from FIG. 5A to 5B to 5C, the rate of rotation of the rear wheel relative to the front wheel is progressively slowed until in FIG. 5C the rear wheel is stationary and the front wheel follows a circle of rotation 56 centred on the rear wheel's position.

In FIGS. 5D, 5E and 5F, the angle of turning of the front wheel 26 continues to increase with the point of intersection 50 moving progressively inside the rear wheel until by FIG. 5F the driven front wheel's axis of rotation 54 is perpendicular to the front-rear axis 48. Once the point of intersection has moved inside the rear wheel (i.e. beyond the steering position of FIG. 5C and towards that of FIG. 5D, the rear wheel reverses its direction of rotation relative to the front wheel (and to the direction in which it had been rotating at lesser steering angles). The reverse speed of rotation continues to increase (relative to the speed of rotation of the front wheel) from FIG. 5C (speed zero) to 5D to 5E to 5F.

In each case the speed chosen will ensure that each wheel can follow its respective circle of rotation 56 (see FIG. 5F) without slipping relative to the other, taking account of the dimensions of the chassis, the positions of the wheels, the steering angle and the wheel diameters.

Figure 6A:
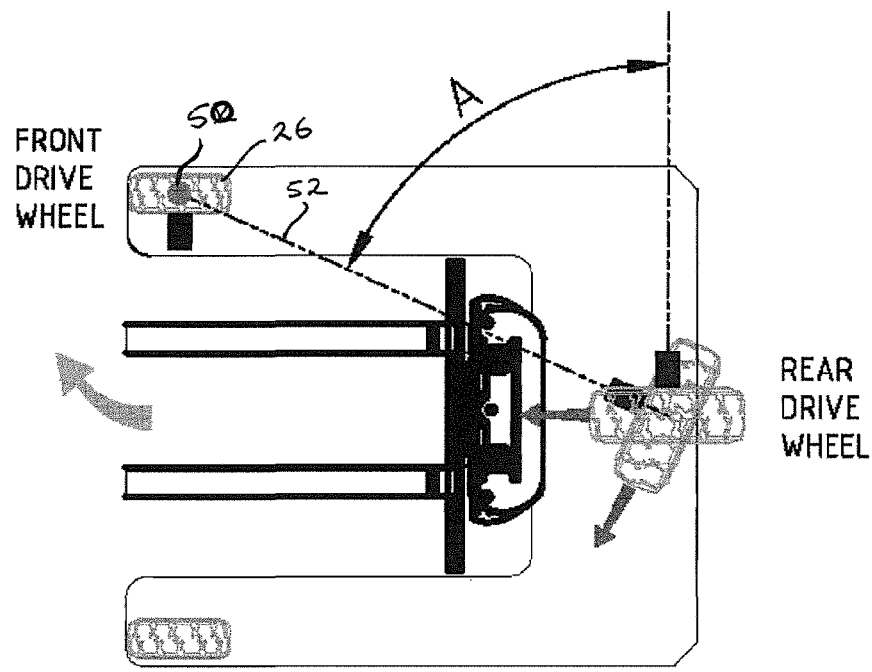
FIG. 6A is a plan view of the truck of FIG. 3 the truck is in a forward/reverse mode.

FIG. 6A shows essentially the same steering situation as FIG. 4D: the truck is in forward/reverse mode, and turning to the right with the point of intersection 50 coincident with the front driven wheel 26 i.e. the rear wheel's axis of rotation 52 passes through the front wheel 26. What FIG. 6A illustrates is that the angle A between the rear wheel's axis when in a neutral steering position and when in the current steering position, is measured by the rear wheel position sensor 40 (FIG. 3)—or is easily determined from that sensor's output—and as that angle increases towards the value seen in FIG. 6A, the speed of the front wheel motor drops to zero in dependence on angle A.

Figure 6B:
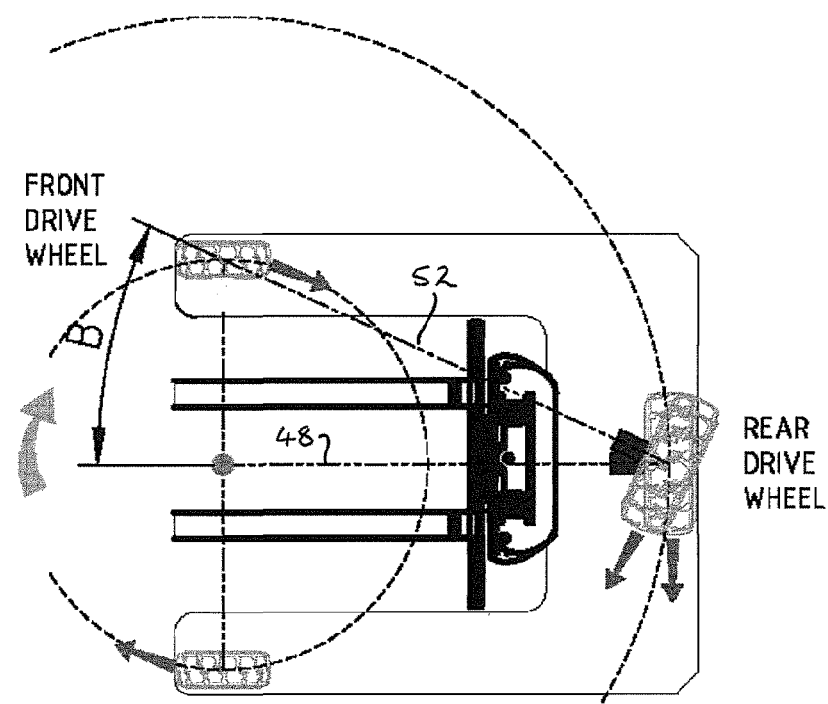
FIG. 6B is a plan view of the truck of FIG. 3 turning.

In FIG. 6B the same position is shown in terms of the angle B between the rear wheel axis of rotation 52 and the front-rear axis of the chassis 48. As the angle B decreases from this position to zero the front wheel electrical motor speed increases in the reverse direction from zero.

Figure 6C:
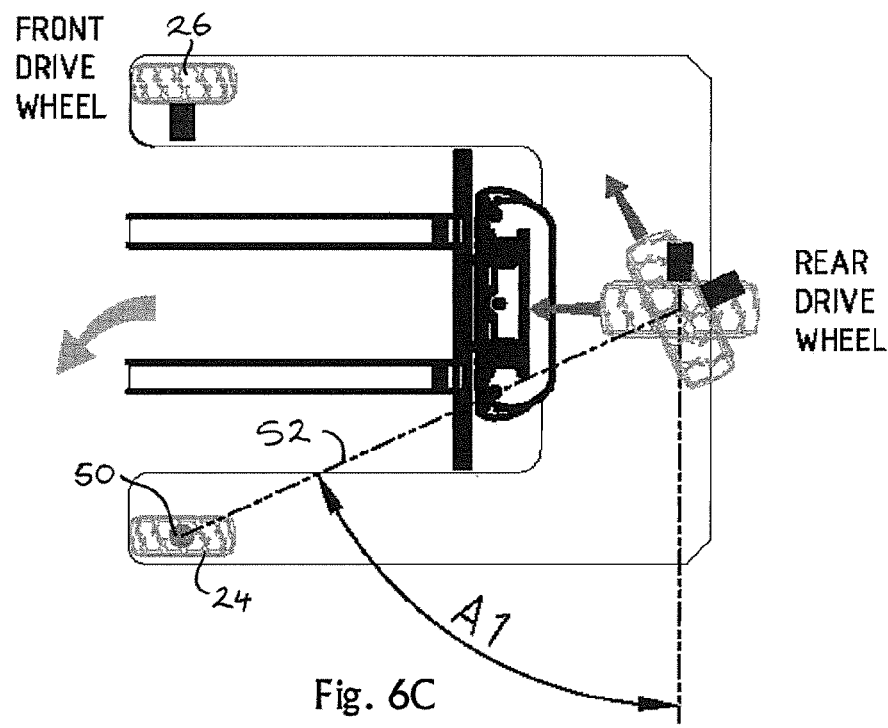
FIG. 6C is a plan view of the truck of FIG. 3 turning.
Figure 6D:
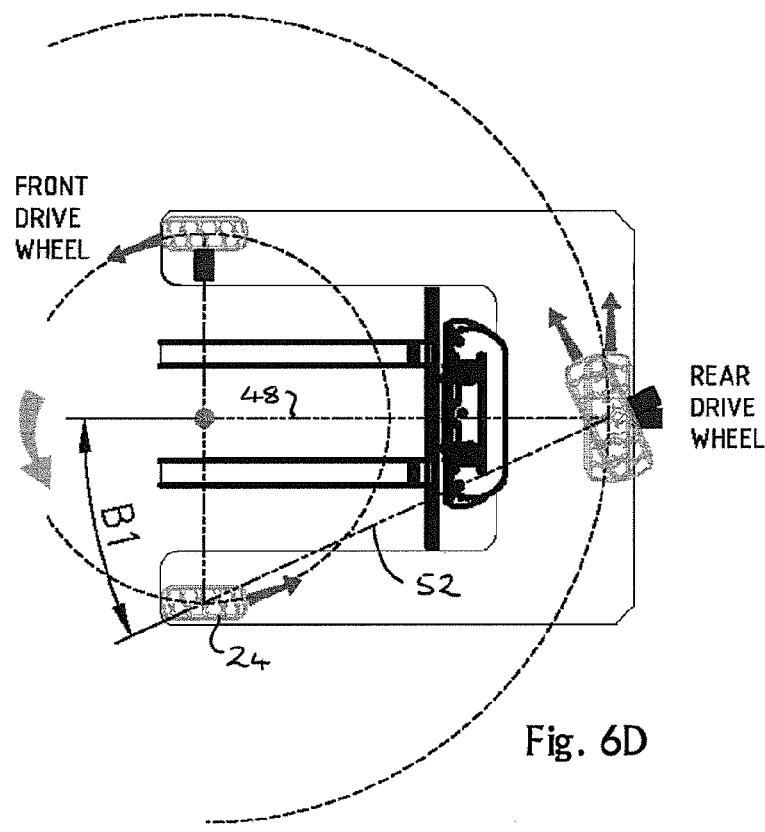
FIG. 6D is a plan view of the truck of FIG. 3 turning.

FIG. 6C shows the same truck steering to the left, i.e. away from the side on which the driven wheel is found. As the steering angle increases, so does the angle shown in FIG. 6C as angle A1. The relative speed of the driven front wheel gradually slows as the angle A1 increases. However when the steering angle is as shown in FIG. 6C the idle wheel speed is zero but the driven wheel is still being rotated in the same direction as the rear wheel, albeit with lesser speed. FIG. 6D shows the same position in terms of an angle B1 which will decrease as the idle wheel begins to turn in the reverse direction with increasing speed, i.e. with the steering angle of the rear wheel axis 52 passing inside the idle wheel 24 position.

Figure 7A:
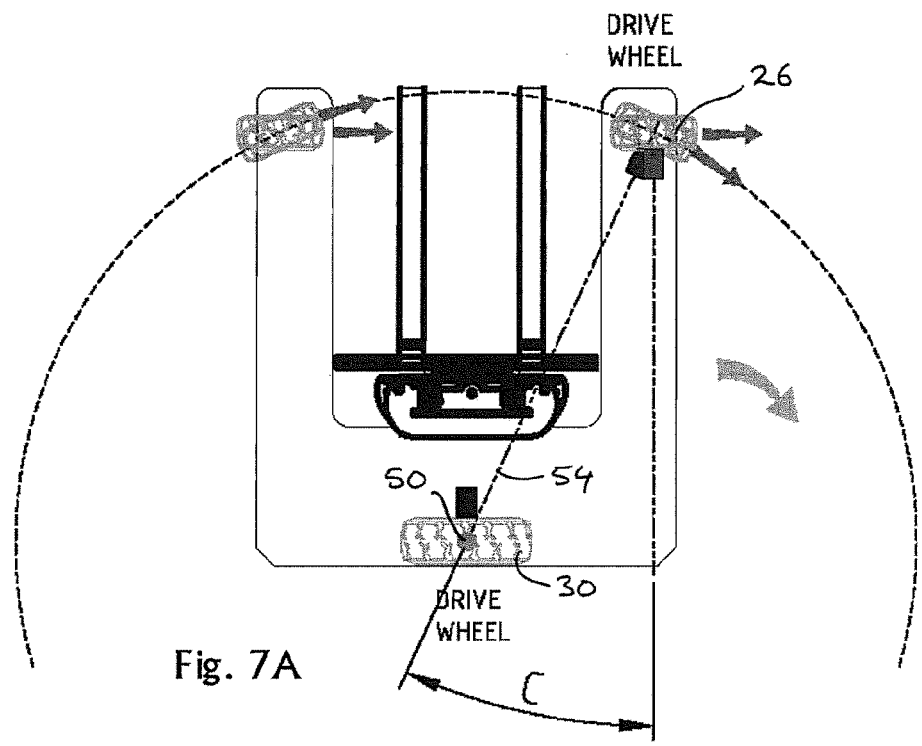
FIG. 7A is a plan view of the truck of FIG. 3 the truck is in a in sideways mode.

FIG. 7A shows the same position as FIG. 5C, i.e. the truck in sideways mode, with the intersection point 50 coincident with the rear wheel position and the axis of rotation 54 of the driven front wheel passing through the rear wheel position. This illustration shows the angle C between the neutral position of the front wheel axis 54 in sideway mode and its current steering angle. The speed of the rear wheel is adjusted by the electrical motor control system based on this angular input from the neutral speed, proportional to the ratio between the wheel diameters when in the neutral steering position, down to zero when C reaches the value shown in FIG. 7A.

Figure 7B:
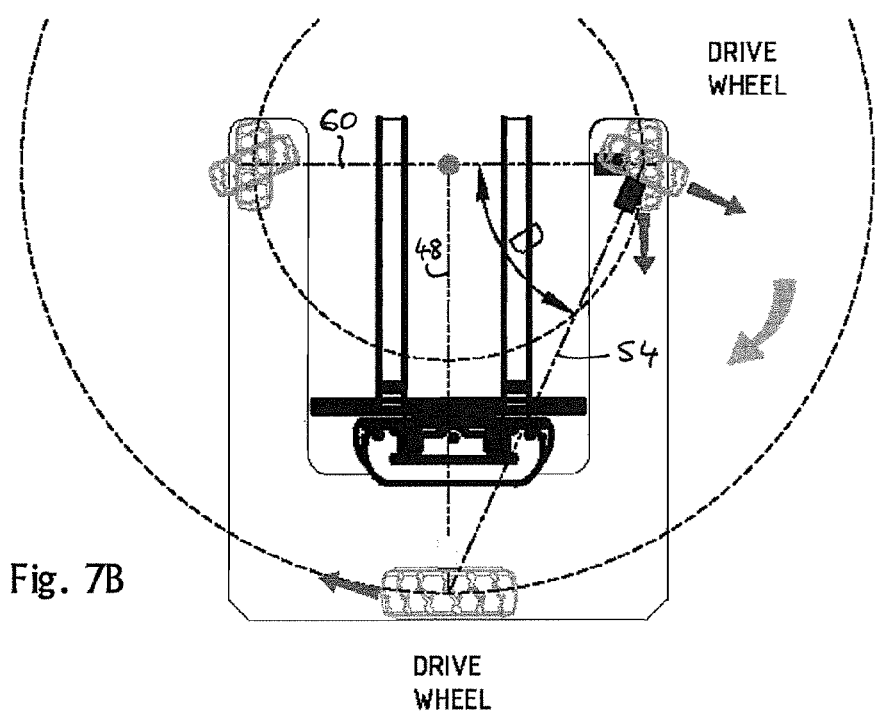
FIG. 7B is a plan view of the truck of FIG. 3 turning.

As seen in FIG. 7B, continued increase in the steering angle beyond that point can be viewed in terms of the angle D between the axis 54 and the axis 60 perpendicular to the front-rear axis of the truck. As D decreases the rear wheel starts to rotate and progressively rotates more quickly with the decrease in angle D.

Figure 7C:
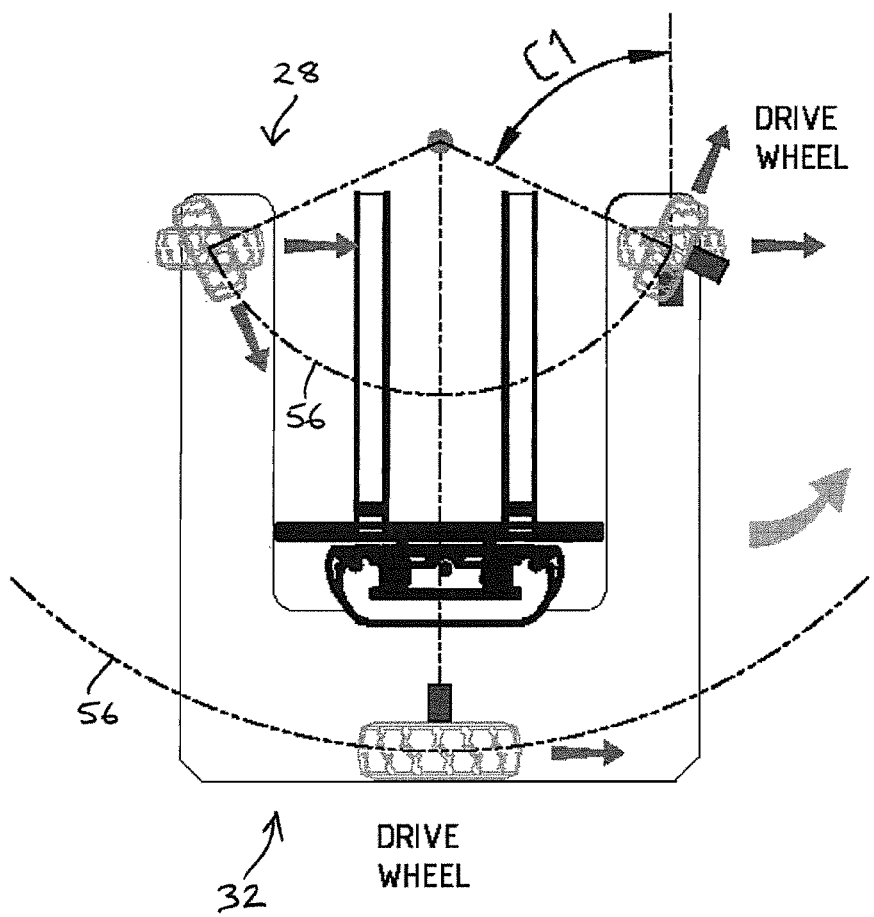
FIG. 7C is a plan view of the truck of FIG. 3 turning.

FIG. 7C shows the same truck in sideways mode steering in the opposite direction, i.e. away from the rear end and towards the front end. The steering angle, relative to the neutral position, is indicated by the angle shown as C1. As C1 increases from zero, the relative speed of the rear wheel is increased by the electrical motor speed control system relative to the speed of the front driven wheel. Again it can be seen that the speed can be calculated as a function of the angle C1 or as a function of the circumference of the respective circles 56 followed by each of the driven wheels.

It will be appreciated that the throttle may be configured to control the front wheel, the rear wheel or both. Advantageously, for the truck illustrated herein, the throttle will control the electrical motor speed of the front wheel when in the sideways mode, with the rear wheel speed being adjusted relative to that of the driven front wheel. In the forward-reverse mode, the throttle will advantageously control the rear wheel speed with the relative speed of the driven front wheel being adjusted to take account of the steering angle. It will be appreciated that the throttle may also control a combination of the two wheel speeds (such as the mean of the two speeds or any other combination) with the electrical motor control adjusting both the front and rear wheels upwardly or downwardly at any given point in time to ensure that the relative speeds of these wheels follows the correct path at the correct speed to ensure traction.

Figure 8:
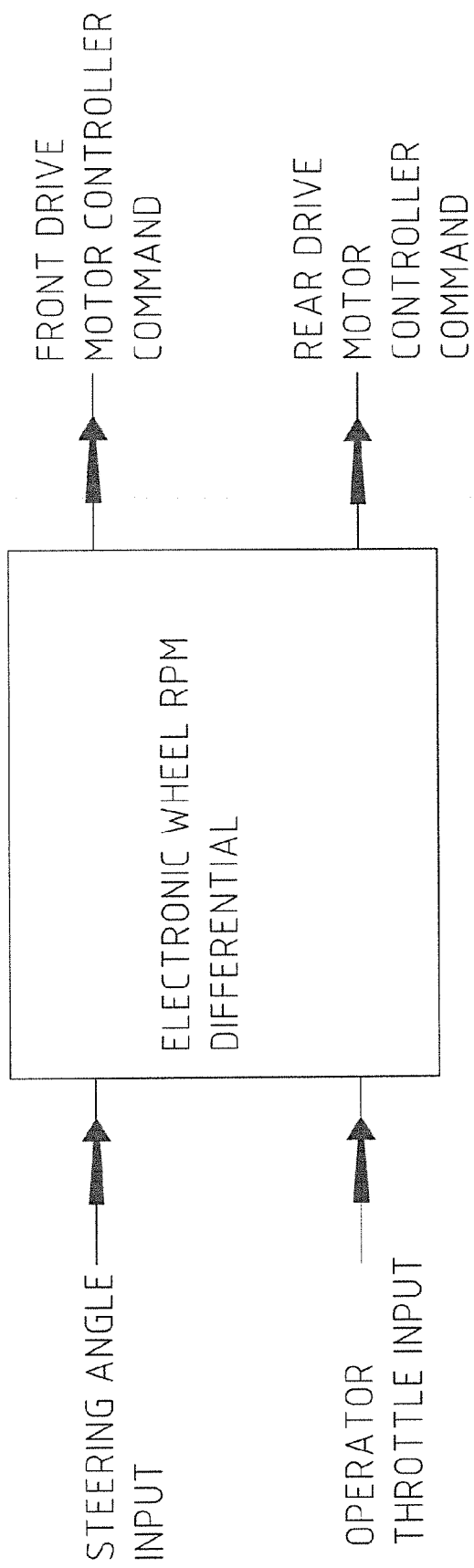
FIG. 8 is a logic diagram depicting electrical motor control for the truck.

FIG. 8 shows a logic diagram for the electrical motor control function. The electrical motor control function, designated by the box labelled "Electronic wheel RPM differential" may be implemented in a single processor in one or other of the motor controllers or elsewhere, or distributed between the two motor controllers. The inputs are the steering angle inputs from the steering angle sensors and the throttle input, while the outputs are motor controller commands to the front and rear drive wheels.

While the present teaching has been described with reference to exemplary arrangements, it will be understood that it is not intended to limit the teaching of the present teaching to such arrangements as modifications may be made without departing from the spirit and scope of the present invention. In this way it will be understood that the present teaching is to be limited only insofar as is deemed necessary in the light of the appended claims.

Similarly the words comprises/comprising when used in the specification are used to specify the presence of stated features, integers, steps or components but do not preclude the presence or addition of one or more additional features, integers, steps, components or groups thereof.

The invention claimed is:

1. A load-carrying truck having a fork lift mechanism mounted on a chassis, the chassis having a front end and a rear end and a left and a right side, the truck comprising:
   a pair of front wheels each disposed towards the front end of the chassis, one on the left side and the other on the right side, and a single rear wheel disposed towards the center of the rear end of the chassis,
   wherein at least one of the front wheels is driven and steerable and the rear wheel is driven and steerable,
   wherein the truck is operable in:
      a forward/reverse mode of operation with the front wheels aligned generally parallel to the front-rear axis of the chassis and with steering controlled by steering the rear wheel which is in a neutral steering position when parallel with the front wheels, and a sideways mode of operation with the rear wheel aligned generally perpendicular to the front-rear axis of the chassis and with steering controlled by steering the at least one of the front wheels which is in a neutral steering position when parallel with the rear wheel, the truck further comprising an electrical motor control system for driving the at least one front wheel and the rear wheel at varying speeds of rotation relative to one another, wherein when the truck is operated in said forward/reverse mode or said sideways mode with neutral steering, the electrical motor control system drives the at least one front wheel and the rear wheel at rotational speeds proportional to one another in inverse relation to the ratio of the front and rear wheel diameters;

wherein when the truck is operated in said forward/reverse mode of operation and is steered in the direction towards the side on which the at least one driven front wheel is located, the relative speed of that wheel is decreased progressively in dependence on the angle of steering of the rear wheel such that the front wheel comes to a stop when the axis of rotation of the rear wheel intersects the front wheel position, and the front wheel is driven in reverse at increasing speeds as the axis of the rear wheel passes said point of intersection with further increasing steering angle; and wherein when the truck is operated in said sideways mode of operation and is turned in the direction towards the rear end of the chassis, the relative speed of the rear wheel is decreased progressively in dependence on the angle of steering of the at least one steered front wheel such that the rear wheel comes to a stop when the axis of rotation of the at least one steered front wheel intersects the rear wheel position, and the rear wheel is driven in reverse at increasing speeds as the axis of the steered front wheel passes said point of intersection with further increasing steering angle.

2. A load-carrying truck as claimed in claim 1, wherein said chassis is generally U-shaped in plan view having a pair of forwardly extending arms one on either side of the fork lift mechanism, with a bridging portion between the arms rearwardly of the forklift mechanism, and wherein the front wheels are located towards the forward ends of the left and right arms respectively and the rear wheel is located generally centrally on the bridge portion.

3. A load carrying truck as claimed in claim 1 wherein the other of the pair of front wheels is an idle undriven wheel.

4. A load carrying truck as claimed in claim 1, further comprising at least one steering angle sensor which provides an input to the electrical motor control system.

5. A load carrying truck as claimed in claim 1, wherein based on one or more input signals received from one or more sensors the electrical motor control system outputs control signals for controlling the driven wheels.

6. A load carrying truck as claimed in claim 5, wherein the input signals include a steering angle input signal.

7. A load carrying truck as claimed in claim 6, wherein the input signals include a throttle input signal.

8. A load carrying truck as claimed in claim 5, wherein the input signals are provided by a plurality of sensors which are associated with the respective driven wheels.

9. A load carrying truck as claimed in claim 8, wherein the inputs signals are provided by at least one of a wheel position sensor, a speed sensor, and a throttle sensor.

10. A load carrying truck as claimed in claim 1, wherein each of the driven wheels is associated with a respective electrical motor which together form the electrical motor control system.

11. A load carrying truck as claimed in claim 9, wherein each of the driven wheels is associated with a respective wheel position sensor.

12. A load carrying truck as claimed in claim 11, wherein each of the driven wheels is associated with a respective speed sensor.

13. A load carrying truck as claimed in claim 12, wherein each of the driven wheels is associated with a respective electrical motor controller.

14. A load carrying truck as claimed in claim 13, wherein the respective electrical motor controllers receive an input signal from a throttle sensor.

15. A load carrying truck as claimed in claim 13, wherein the respective electrical motor controllers recieve an input signal from the respective wheel position sensor.

16. A load carrying truck as claimed in claim 13, wherein the respective electrical motor controllers receive an input signal from the respective speed sensors.

* * * * *